R. L. HARNER.
ELEVATING AND TOPPING MECHANISM FOR BEET HARVESTERS.
APPLICATION FILED MAY 14, 1917.
1,263,408.
Patented Apr. 23, 1918.
2 SHEETS—SHEET 2.
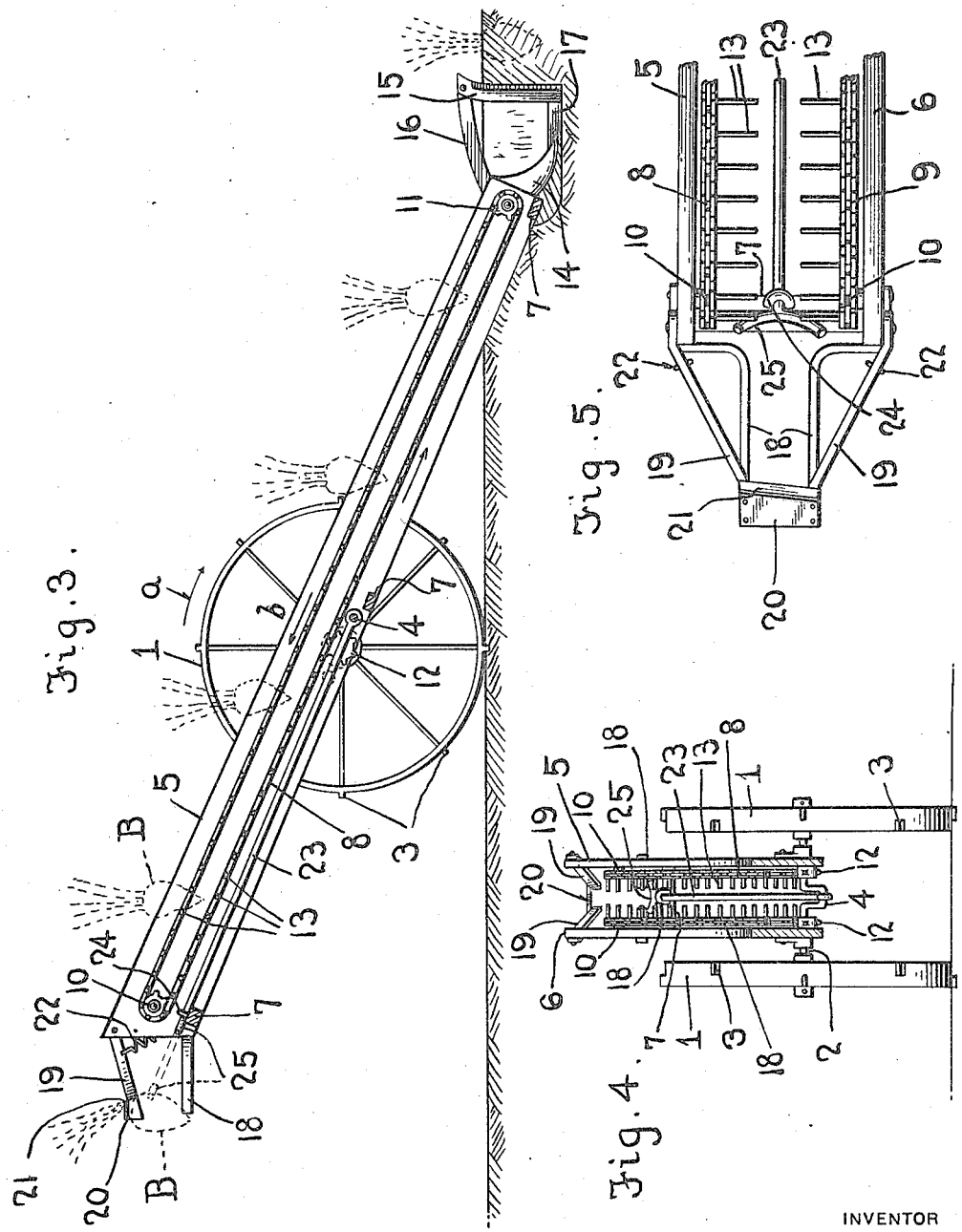
WITNESSES
L. B. James
S. M. McColl
INVENTOR
Russell L. Harner
BY Richard Owen,
ATTORNEY

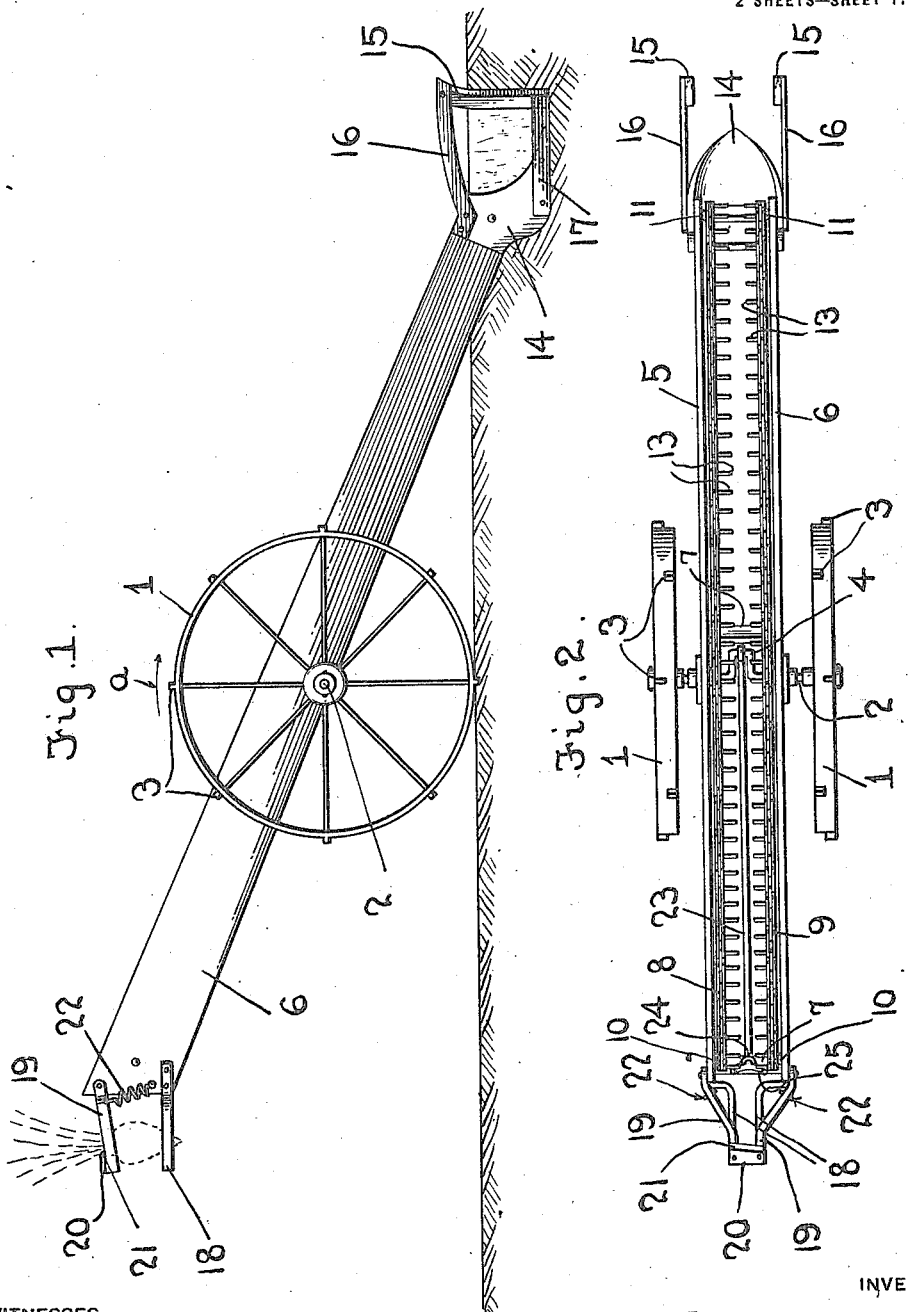

UNITED STATES PATENT OFFICE.

RUSSELL L. HARNER, OF ELKHART, INDIANA.

ELEVATING AND TOPPING MECHANISM FOR BEET-HARVESTERS.

1,263,408. Specification of Letters Patent. Patented Apr. 23, 1918.

Application filed May 14, 1917. Serial No. 168,530.

*To all whom it may concern:*

Be it known that I, RUSSELL L. HARNER, a citizen of the United States, residing at Elkhart, in the county of Elkhart and State of Indiana, have invented certain new and useful Improvements in Elevating and Topping Mechanism for Beet-Harvesters, of which the following is a specification.

This invention relates broadly to agricultural implements and more particularly to elevators and topping means for beet harvesters.

The primary object of the invention is to provide simple and efficient mechanism for conveying beets to the rear of the machine where the tops are removed and the beets ejected from the machine.

Another object is to provide simple and efficient means for conveying the beets from the uprooting mechanism to the topper.

Still another object is to provide simple and efficient means for transferring the beets from the conveyer to the topper and for forcibly engaging them with the cutting knife of the topper.

Another object is to construct a simple and efficient topper for a machine of this character.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of a beet harvester constructed in accordance with this invention, Fig. 2 is a top plan view thereof, Fig. 3 is a longitudinal central section, Fig. 4 is a transverse section thereof looking toward the rear, and Fig. 5 is an enlarged detail top plan view of the rear portion of the machine.

In the embodiment illustrated, the machine is shown mounted on a pair of traction wheels 1 connected by an axle 2, said wheels being provided with spurs or lugs 3.

The axle 2 has a crank portion 4 therein designed for a purpose presently to be described.

A beet conveying trough is shown mounted between the wheels 1 and is composed of two edgewise disposed side boards 5 and 6 connected at their lower edges by cross bars 7 and open at both ends.

Mounted to travel between the side boards 5 and 6 is a flexible carrier or elevator composed of two endless sprocket chains 8 and 9 which travel over sprocket gears as 10 and 11 arranged at the opposite ends of the trough as is shown clearly in Fig. 3. These chains are actuated by sprocket gears 12 secured to the axle 2 and over which the lower stretches of the chain are designed to pass and be engaged thereby so that on the turning of the wheels in the direction of the arrows *a* shown in Figs. 1 and 3, motion will be transmitted from the sprocket gears 12 which are fixed to the axle of said wheels and thereby cause the chains to move rearwardly and upwardly in the direction of the arrow *b* as shown in Fig. 3. Extending inwardly toward each other from the chains 8 and 9 are a plurality of longitudinally spaced pins or fingers 13 which are designed to receive between them the beets B scooped up by the uprooting mechanism to be described and to be conveyed upwardly and rearwardly as shown clearly in Fig. 3 and are ejected from the top of said conveyer and transferred to the topping mechanism as will be presently described.

It will thus be seen that the side boards 5 and 6 together with the finger carrying chains 8 and 9 constitute the trough through which the beets uprooted are passed and discharged from the upper end thereof as will be presently described.

Mounted at the lower end of the trough between the side boards 5 and 6 is a scoop 14, the configuration of which is shown clearly in Fig. 2. This scoop 14 curves downwardly and forwardly and is designed to scoop up a beet and pass it on to the conveyer above described. Disposed in advance of the scoop 14 are a pair of earth loosening blades 15, one being arranged at each side of the scoop and supported by suitable braces 16 and 17 which project forwardly from the sides of the scoop and are secured thereto by any suitable means (see Figs. 1, 2 and 3). These cutting blades 15 are designed to loosen up the earth on opposite sides of the beet to be harvested so that the scoop 14 may readily pass under the beet as shown clearly in Fig. 3 and lift it with the earth surrounding it on to the scoop and pass it up between the finger carrying chains of the conveyer. It will thus be seen that when the beet is engaged by these fingers 13 the earth surrounding it will drop off and the beet alone will be elevated by the conveyer.

The beet topping mechanism which constitutes one feature of this invention is carried by the upper rear end of the trough and as shown, comprises a pair of rearwardly projecting laterally spaced rods 18 which are arranged apart a sufficient distance to receive between them and support the beet to be topped and which is delivered thereonto from the conveyer by ejecting means hereinafter to be described.

A pair of converging arms 19 extend rearwardly from the upper edges of the side bars or boards 5 and 6 and a cutting knife 20 connects the free rear ends of these arms extending transversely between them and being provided with a knife edge 21 facing toward the trough and which is preferably disposed at an oblique angle as is shown clearly in Figs. 2 and 5. These arms 19 are pivotally connected with the side bars 5 and 6 and are drawn yieldably downward by a coiled spring 22 (see Figs. 1 and 3). This coiled spring 22 is designed to hold the cutter 20 in the proper position to engage the top of the beet which is to be ejected and by means of which said top is removed without danger of cutting the beet itself which would be likely to cause it to bleed and which is undesirable for many reasons.

The beet transferring and ejecting mechanism comprises a rod 23 connected at one end with the crank 4 of the axle 2 and which extends rearwardly upward through the trough at the bottom thereof below the lower stretch of the conveyer and is guided in a suitable keeper 24 carried by the upper cross bar 7. The free end of this rod 23 is bifurcated as shown at 25 (see Figs. 2 and 5). The furcations of this rod 23 are so shown as to form when combined an arcuate beet engaging member which is designed to conform to the curvature of the beet so that when engaged thereby, the beet will be projected in the manner shown in dotted lines in Fig. 3, and all danger or injury to the beet will thereby be obviated.

It will thus be seen that by so mounting this rod 23 and connecting it with the crank portion 4 of the axle 2 the rotation of the wheels 1 when the machine is in operation will cause this rod to reciprocate, the reciprocations of which are so timed that the bifurcated free end will be projected at the moment the beet reaches the end of the conveyer so that it will engage said beet when it drops off the end of the conveyer and move it rearwardly between rods 18 and cause the top thereof to be forcibly engaged with the cutting edge 21 of the cutter 20. This forcible engagement causes the top to be cut off and the beet to be ejected from the machine as is shown clearly in dotted lines in Fig. 3 and it may be caught in any suitable receptacle or allowed to drop on to the ground at the will of the operator.

Any suitable means may be provided for propelling this machine and as they constitute no part of this invention, said means have not been shown.

While this machine is shown constructed for use in harvesting beets from a single row only, it will be obvious that by lengthening the axle 2 any desired number of these troughs may be mounted on the axle so that the beets from a plurality of rows may be simultaneously harvested.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim:—

1. In a beet harvester, a supporting structure, an elevator mounted in said structure, a topper at the rear of said elevator, and means for ejecting and guiding the beets from said elevator to the topper.

2. In a beet harvester, a supporting structure, an elevator mounted in said structure, a topper at the rear of said elevator, and reciprocatory means for engaging and forcing the beets delivered from said elevator to said topper.

3. In a beet harvester, a supporting structure, an elevator mounted in said structure, a topper at the rear of said elevator, a rod mounted to reciprocate below said elevator and in a plane parallel therewith and provided at its rear end with beet engaging means whereby a beet delivered from the elevator is engaged by said means and forcibly engaged with the topper.

4. In a beet harvester, a supporting structure, an elevator mounted in said structure, a topper at the rear of said elevator, provided with a cutter, and means for pushing the beets from the elevator to the topper into forcible engagement with said cutter.

5. In a beet harvester, a supporting structure, an elevator mounted in said structure, a topper at the rear of said elevator, provided with a cutter, and means for pushing the beets from the elevator to the topper into forcible engagement with said cutter, said cutter being yieldable vertically to position it in proper relation to the beet to be topped.

6. In a beet harvester, a supporting structure, an elevator mounted in said structure, a topper disposed at the rear of said elevator and spaced therefrom, said topper comprising beet guiding means, and a vertically yieldable cutter disposed above said guiding means and adapted to be positioned in proper relation for removing the top of a beet delivered to the topper from the elevator.

7. In a beet harvester, a supporting structure, an elevator mounted in said structure, a topper disposed at the rear of said elevator and spaced therefrom, said topper comprising beet guiding means, a vertically yieldable cutter disposed above said guiding means and adapted to be positioned in proper relation for removing the top of a beet delivered to the topper from the elevator, and means adapted to engage a beet between the guiding means of the topper and the cutter whereby the beet is forcibly engaged with the cutter to remove the top therefrom.

8. A beet harvester including a topper comprising a pair of laterally spaced guide arms, a pair of converging arms pivotally mounted above said guide arms, a cutting blade carried by the free ends of said converging arms with its knife edge disposed toward the rear, and means for yieldably drawing said pivoted arms toward said guide arms.

9. In a beet harvester, a trough-like structure open at its top and bottom and both ends, a beet conveyer mounted to move longitudinally through said trough, a topper carried by its other end, and longitudinally movable beet ejecting means arranged in said trough below said conveyer.

10. In a beet harvester, a trough-like structure open at its top and bottom and both ends, a beet conveyer mounted to move longitudinally through said trough, a topper carried by its other end, beet ejecting means comprising a crank shaft mounted to rotate transversely of said trough, a rod connected at one end to the crank of said shaft and having beet engaging means at its other end, and guiding means for said rod.

11. In a beet harvester, a trough-like structure open at its top and bottom and both ends, a beet conveyer mounted to move longitudinally through said trough, a topper carried by its other end, beet ejecting means comprising a crank shaft mounted to rotate transversely of said trough, a rod connected at one end to the crank of said shaft, an arcuate beet engaging member carried by the other end of said rod and positioned to engage a beet when it leaves said conveyer and to direct it into operative engagement with said topper.

In testimony whereof I affix my signature in presence of two witnesses.

RUSSELL L. HARNER.

Witnesses:
M. C. HARNER,
LEE WILLIS.

Copies of this patent may be obtained for five cents each, by addressing the "Commissioner of Patents, Washington, D. C."